US012678878B2

(12) United States Patent
Yan

(10) Patent No.: US 12,678,878 B2
(45) Date of Patent: Jul. 14, 2026

(54) SYSTEM AND METHOD FOR DETERMINING WHETHER TO CLEAN A REFLOW OVEN

(71) Applicant: Illinois Tool Works Inc., Glenview, IL (US)

(72) Inventor: Shenghu Yan, Suzhou (CN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/734,774

(22) Filed: Jun. 5, 2024

(65) Prior Publication Data

US 2024/0424588 A1      Dec. 26, 2024

(30) Foreign Application Priority Data

Jun. 26, 2023      (CN) .......................... 202310763867.1

(51) Int. Cl.
*B23K 1/00*          (2006.01)
*B23K 1/20*          (2006.01)
(Continued)

(52) U.S. Cl.
CPC ................ *B23K 1/206* (2013.01); *B23K 3/08* (2013.01)

(58) Field of Classification Search
CPC .......... B23K 1/206; B23K 3/08; B23K 1/008; B23K 37/00; B23K 1/0016;
(Continued)

(56) References Cited

U.S. PATENT DOCUMENTS 6,536,649 B1 *  3/2003  Master .............. H01L 21/67253
                                                                228/19
2003/0136020 A1 *  7/2003  Miller, Jr. .............. B23K 1/008
                                                                34/429
(Continued)

FOREIGN PATENT DOCUMENTS

CN          104907665 A  *  9/2015
CN          105517365 A  *  4/2016  ............. B23K 1/008
(Continued)

OTHER PUBLICATIONS

European Office Communication with extended search report Appln No. 24183207.0 dated Dec. 4, 2024.

*Primary Examiner* — Kiley S Stoner
(74) *Attorney, Agent, or Firm* — McAndrews, Held & Malloy, Ltd.

(57)          ABSTRACT

Disclosed example systems for determining whether to clean a reflow oven include: an image acquisition device, a processing unit, and a determining unit. The image acquisition device acquires an image of the interior of the reflow oven when the reflow oven is in a closed state, and stores the acquired image. The image acquisition device is conveyed through a reflow oven chamber of the reflow oven to acquire the image of the interior of the reflow oven. The image of the interior of the reflow oven comprises an image of a surface of a reflow oven chamber device and/or an image of a rail adjustment device. The processing unit processes the stored image to obtain a cleanliness condition of the interior of the reflow oven. The determining unit determines whether the reflow oven needs to be cleaned based on the obtained cleanliness condition of the interior of the reflow oven.

9 Claims, 11 Drawing Sheets

(51) Int. Cl.
  B23K 3/00 (2006.01)
  B23K 3/08 (2006.01)

(58) Field of Classification Search
  CPC ............. B23K 2101/36–42; F27B 9/00; F27B
      9/3077; F27D 5/0037; F27D 19/00; F27D
      21/02; H05K 3/3494; H05K 3/34; H04N
      23/50; H04N 5/76; H04N 7/181; H04N
      23/51; H04N 23/56
  USPC ................ 228/179.1–180.22, 102–103, 105,
      228/201–202, 205–206, 8–12
  See application file for complete search history.

(56) References Cited

U.S. PATENT DOCUMENTS

| | | | | |
|---|---|---|---|---|
| 2021/0178307 A1 * | 6/2021 | Wang | .................... | H05B 1/0247 |
| 2023/0359153 A1 * | 11/2023 | Bentley | ................ | H05B 1/0263 |
| 2024/0424588 A1 * | 12/2024 | Yan | ......................... | F27D 21/02 |
| 2024/0426555 A1 * | 12/2024 | Chen | ........................ | B23K 3/04 |

FOREIGN PATENT DOCUMENTS

| | | | | | |
|---|---|---|---|---|---|
| CN | 105921451 A | * | 9/2016 | ............. | B08B 3/022 |
| CN | 110893495 A | * | 3/2020 | ............. | B23K 1/20 |
| CN | 112872522 A | * | 6/2021 | | |
| CN | 113547182 A | * | 10/2021 | ............. | B23K 1/008 |
| CN | 114473118 A | * | 5/2022 | | |
| CN | 116329698 A | * | 6/2023 | | |
| CN | 116604123 A | * | 8/2023 | | |
| CN | 118002876 A | * | 5/2024 | | |
| DE | 102004031713 B3 | * | 12/2005 | ........... | B01D 5/0021 |
| EP | 1611987 A2 | * | 1/2006 | ............. | B08B 7/00 |
| JP | 2020177069 | | 10/2020 | | |
| TW | I792296 B | * | 2/2023 | ............. | B41F 35/00 |
| WO | 2023040617 | | 3/2023 | | |

* cited by examiner

SYSTEM AND METHOD FOR DETERMINING WHETHER TO CLEAN A REFLOW OVEN

RELATED APPLICATIONS

The present application claims the benefit of Chinese (CN) Patent Application No. 202310763867.1, filed Jun. 26, 2023. The entirety of Chinese (CN) Patent Application No. 202310763867.1 is expressly incorporated herein by reference.

TECHNICAL FIELD

The present disclosure relates to a reflow oven, and in particular, to a system and method for determining whether to clean a reflow oven.

BACKGROUND

During the manufacture of printed circuit boards, electronic elements are mounted on the circuit boards generally by using a process known as "reflow soldering". In a typical reflow soldering process, solder paste (e.g., tin paste) is deposited onto selected areas of a circuit board, and wires of one or more electronic elements are inserted into the deposited solder paste. The circuit board then passes through a reflow oven. In the reflow oven, the solder paste reflows (i.e., being heated to a melting or reflow temperature) in a high-temperature zone of a hearth of the reflow oven and is then cooled in a cooling zone of the hearth to electrically and mechanically connect the wires of the electronic elements to the circuit board. As used herein, the term "circuit board" or "printed circuit board (PCB)" includes a substrate assembly of any type of electronic elements, for example, including a wafer substrate. In the reflow oven, air or a substantially inert gas (e.g., nitrogen) is generally used as a working gas, and different working gases are used for circuit boards having different process requirements. The hearth of the reflow oven is full of the working gas, and the circuit board is soldered in the working gas while being conveyed through the hearth by a conveying device.

BRIEF SUMMARY

Tin paste includes not only a solder, but also a soldering flux which promotes wetting of the solder and provides a good solder joint. Other additives such as solvents and catalysts may also be included in the tin paste. After the tin paste is printed on a circuit board, the circuit board is conveyed on a conveyor to pass through a plurality of high-temperature zones of a hearth of a reflow oven. Heat in the high-temperature zones melts the tin paste, and organic compounds containing volatile organic compounds (VOCs), mainly including a soldering flux, are vaporized into vapor, thereby forming "contaminants". These contaminants are mixed with a working gas in the high-temperature zones to form a waste gas. The accumulation of these contaminants in the hearth of the reflow oven may cause some problems. For example, when the circuit board is conveyed from the high-temperature zones to a cooling zone, the contaminants also flow to the cooling zone, and the contaminants will condense into a liquid and/or a solid and drip onto the circuit board after being cooled in the cooling zone, thus contaminating the circuit board. As a result, a subsequent cleaning step has to be performed. Moreover, condensates may also drip onto subsequent circuit boards; consequently, elements on the circuit boards may be damaged, or the contaminated circuit boards have to be cleaned in subsequent steps.

The inventors have found that in the prior art, the reflow oven is cleaned by pre-arranged maintenance. However, the pre-arranged maintenance may be too early or too late, resulting in undesired downtime, thereby reducing the production efficiency.

In order to solve the above problems, the present disclosure provides a system and method for determining whether to clean a reflow oven, to acquire an image of the interior of the reflow oven when the reflow oven is in a closed state so as to determine a cleanliness condition of the interior of the reflow oven, and then determine whether the reflow oven needs to be cleaned based on the cleanliness condition. According to the present disclosure, a user can be prompted to clean and maintain the reflow oven at a reasonable time, thereby improving the production efficiency and reducing unnecessary downtime.

According to a first aspect of the present disclosure, the present disclosure provides a system for determining whether to clean a reflow oven. The system comprises an image acquisition device, a processing unit, and a determining unit. The image acquisition device is configured to be capable of acquiring an image of the interior of the reflow oven when the reflow oven is in a closed state, and storing the acquired image. The processing unit is configured to process the stored image to obtain a cleanliness condition of the interior of the reflow oven. The determining unit is configured to determine whether the reflow oven needs to be cleaned based on the obtained cleanliness condition of the interior of the reflow oven.

According to the first aspect of the present disclosure, the reflow oven comprises a reflow oven chamber configured to enable a workpiece to be transported through the reflow oven chamber and processed in the reflow oven chamber. The image acquisition device is configured to be conveyed through the reflow oven chamber of the reflow oven to acquire the image of the interior of the reflow oven.

According to the first aspect of the present disclosure, the image acquisition device is configured to be mounted to a conveying device of the reflow oven, such that the mounted image acquisition device can be conveyed through the reflow oven chamber of the reflow oven by the conveying device.

According to the first aspect of the present disclosure, the reflow oven comprises a reflow oven chamber device and a reflow oven chamber. The reflow oven chamber device is configured to be capable of delivering a gas flow to the reflow oven chamber to process a workpiece in the reflow oven chamber. The image of the interior of the reflow oven comprises an image of a surface of the reflow oven chamber device of the reflow oven.

According to the first aspect of the present disclosure, the reflow oven comprises a rail adjustment device. The rail adjustment device is configured to be capable of adjusting the width of a rail for a workpiece. The image of the interior of the reflow oven comprises an image of the rail adjustment device.

According to the first aspect of the present disclosure, the image acquisition device comprises a light source, an image acquisition unit, a controller, and a power source. The light source is configured to illuminate the interior of the reflow oven. The image acquisition unit is configured to acquire the image of the interior of the reflow oven when the light source illuminates the interior of the reflow oven. The controller is configured to control operations of the image acquisition unit and the light source to cause the image acquisition unit to acquire the image of the interior of the reflow oven, and to store the image acquired by the image acquisition unit. The power source is configured to supply power to the light source, the image acquisition unit, and the controller.

According to the first aspect of the present disclosure, the image acquisition device further comprises a housing and a mounting structure. The housing is configured to accommodate the light source, the image acquisition unit, the controller, and the power source, and to insulate against the heat in the reflow oven. The mounting structure is configured to support the housing and to be capable of being mounted to a conveying device of the reflow oven, so as to enable the image acquisition device to be conveyed through the reflow oven by the conveying device.

According to the first aspect of the present disclosure, the housing comprises a transparent partition. The transparent partition is disposed above the light source and the image acquisition unit, and is configured to block heat transfer from the reflow oven to the light source and the image acquisition unit.

According to the first aspect of the present disclosure, the image acquisition device is an integrated device.

According to a second aspect of the present disclosure, the present disclosure provides a method for determining whether to clean a reflow oven. The method comprises: acquiring an image of the interior of the reflow oven when the reflow oven is in a closed state; storing the acquired image; processing the stored image to obtain a cleanliness condition of the interior of the reflow oven; and determining whether the reflow oven needs to be cleaned based on the obtained cleanliness condition of the interior of the reflow oven.

According to the second aspect of the present disclosure, the reflow oven comprises a reflow oven chamber. The reflow oven chamber is configured to enable a workpiece to be transported through the reflow oven chamber and processed in the reflow oven chamber.

Acquiring an image of the interior of the reflow oven comprises: conveying an image acquisition device through the reflow oven chamber of the reflow oven to cause the image acquisition device to acquire the image of the interior of the reflow oven.

According to the second aspect of the present disclosure, conveying an image acquisition device through the reflow oven chamber of the reflow oven comprises: mounting the image acquisition device to a conveying device of the reflow oven, and conveying the mounted image acquisition device through the reflow oven chamber of the reflow oven by the conveying device.

According to the second aspect of the present disclosure, the reflow oven comprises a reflow oven chamber device and a reflow oven chamber. The reflow oven chamber device is configured to be capable of delivering a gas flow to the reflow oven chamber to process a workpiece in the reflow oven chamber. Acquiring an image of the interior of the reflow oven comprises: acquiring an image of a surface of the reflow oven chamber device of the reflow oven.

According to the second aspect of the present disclosure, the reflow oven comprises a rail adjustment device. The rail adjustment device is configured to be capable of adjusting the width of a rail for a workpiece. Acquiring an image of the interior of the reflow oven comprises: acquiring an image of the rail adjustment device.

According to the second aspect of the present disclosure, processing the stored image to obtain a cleanliness condition of the interior of the reflow oven comprises: processing the stored image to obtain the color and area of contaminants inside the reflow oven.

According to the second aspect of the present disclosure, determining whether the reflow oven needs to be cleaned comprises: determining whether the reflow oven needs to be cleaned by means of artificial intelligence training.

According to the second aspect of the present disclosure, determining whether the reflow oven needs to be cleaned comprises: determining that the reflow oven needs to be cleaned within a predetermined period of time and determining that the reflow oven needs to be cleaned immediately.

According to the second aspect of the present disclosure, determining whether the reflow oven needs to be cleaned based on the obtained cleanliness condition of the interior of the reflow oven comprises: comparing the obtained cleanliness condition of the interior of the reflow oven with a reference cleanliness condition of the interior of the reflow oven to determine whether the reflow oven needs to be cleaned.

According to a third aspect of the present disclosure, the present disclosure provides a reflow oven, which comprises a system for determining whether to clean a reflow oven described above.

According to a fourth aspect of the present disclosure, the present disclosure provides a reflow oven for implementing a method described above.

BRIEF DESCRIPTION OF THE DRAWINGS

The accompanying drawings are not drawn to scale. In the accompanying drawings, each identical or nearly identical component denoted in different figures is denoted by the same reference sign. For the sake of clarity, not every component may be labeled in every figure. In the figures.

DETAILED DESCRIPTION

Various specific implementations of the present disclosure are described below with reference to the accompanying drawings which constitute part of this specification. It should be understood that although the terms indicating directions, such as "front", "rear", "upper", "lower", "left" and "right", are used in the present disclosure to describe structural parts and elements in various examples of the present disclosure, these terms are used herein only for ease of description and are determined based on the exemplary orientation as shown in the accompanying drawings. Since the arrangements in the embodiments disclosed in the present disclosure may be in various directions, these terms indicating directions are only illustrative and should not be considered as limitations.

Figure 1A:
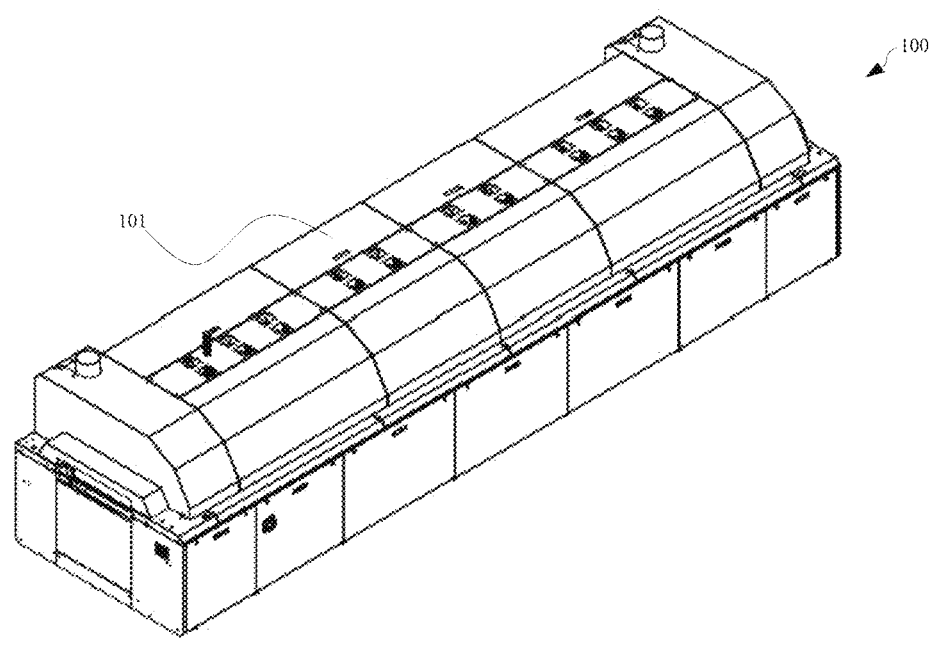
FIG. 1A is a perspective view of a reflow oven according to the present disclosure.
Figure 1B:
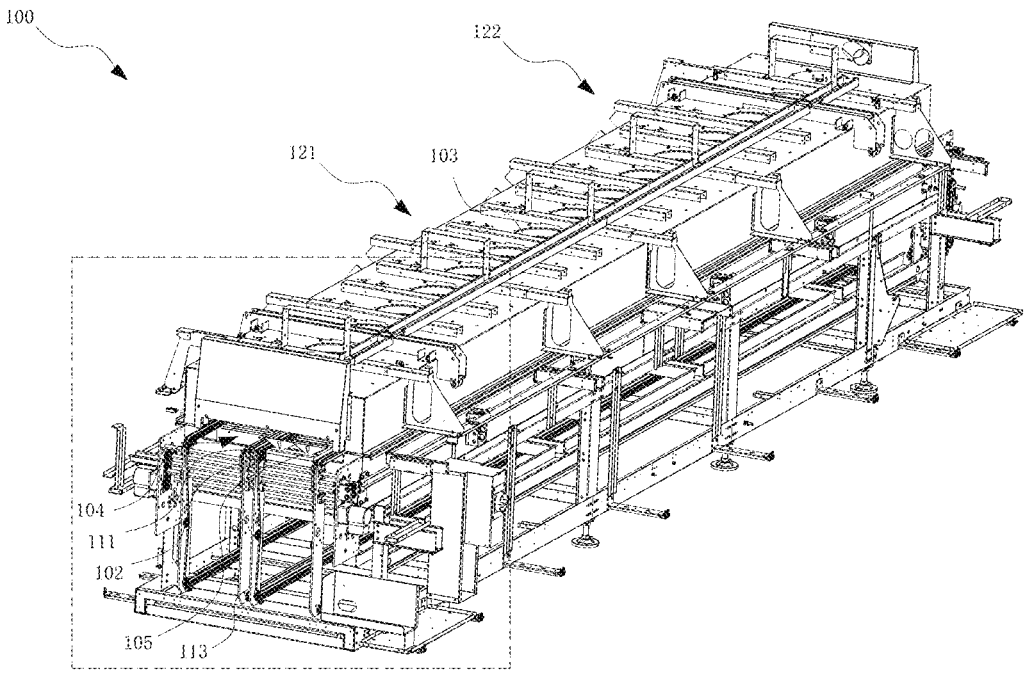
FIG. 1B is a perspective view of the reflow oven shown in FIG. 1A with a housing removed.
Figure 1C:
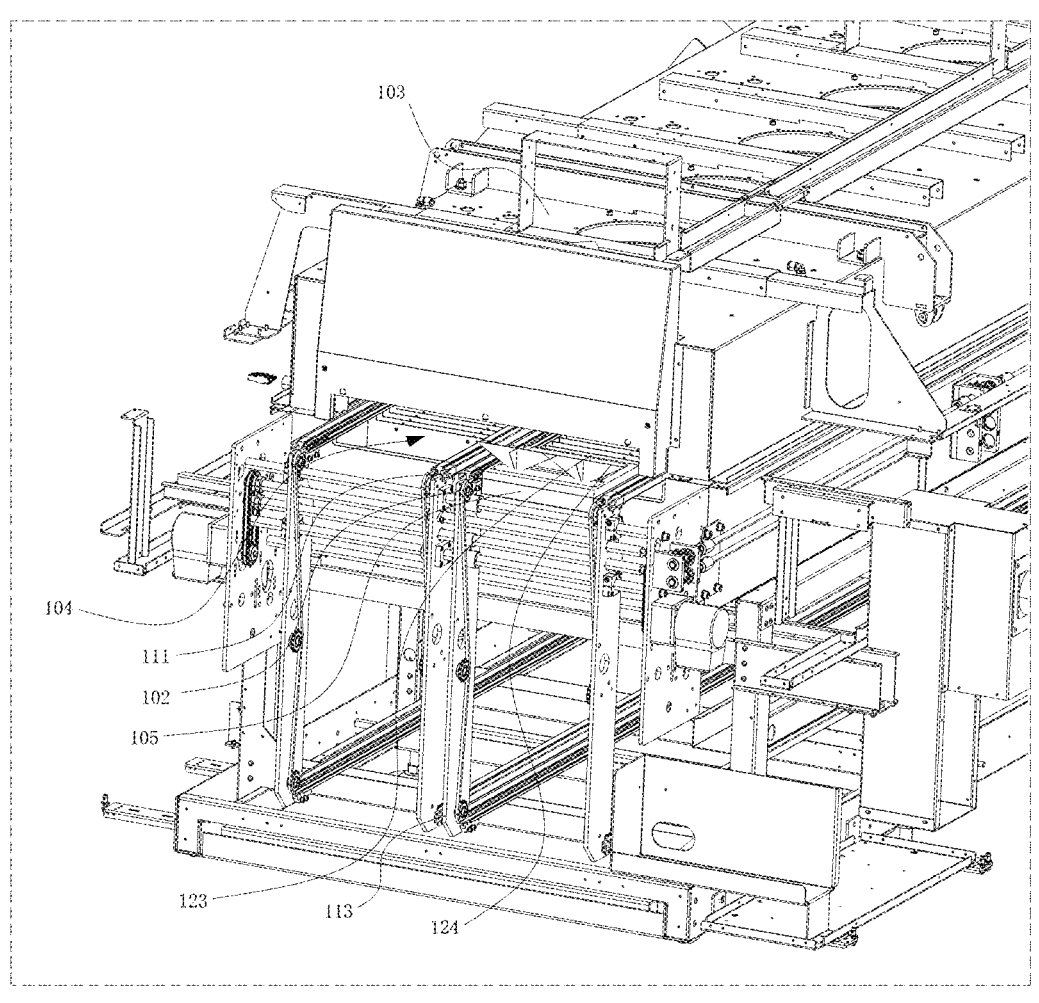
FIG. 1C is a partial enlarged view of FIG. 1B.
Figure 1D:
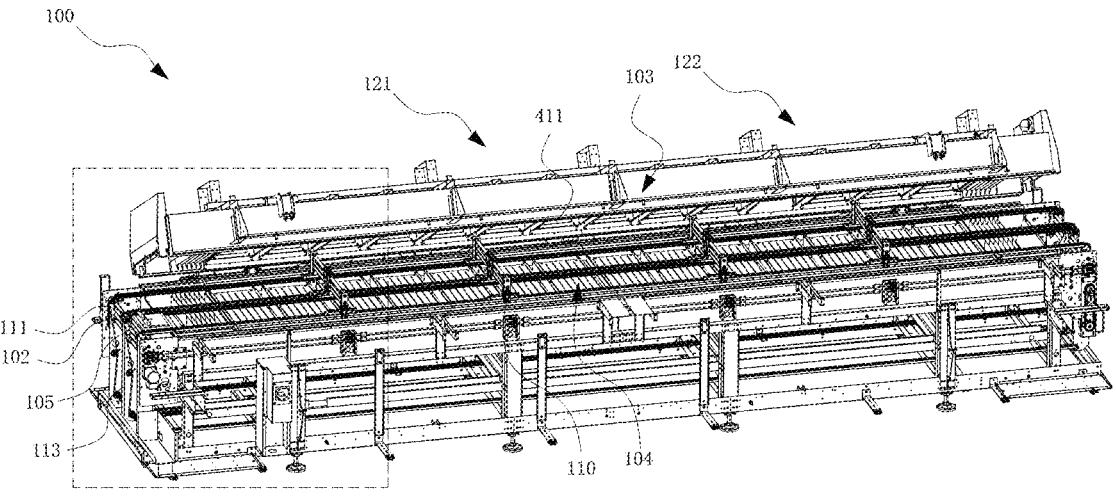
FIG. 1D is a perspective view of the reflow oven shown in FIG. 1B in an open state.
Figure 1E:
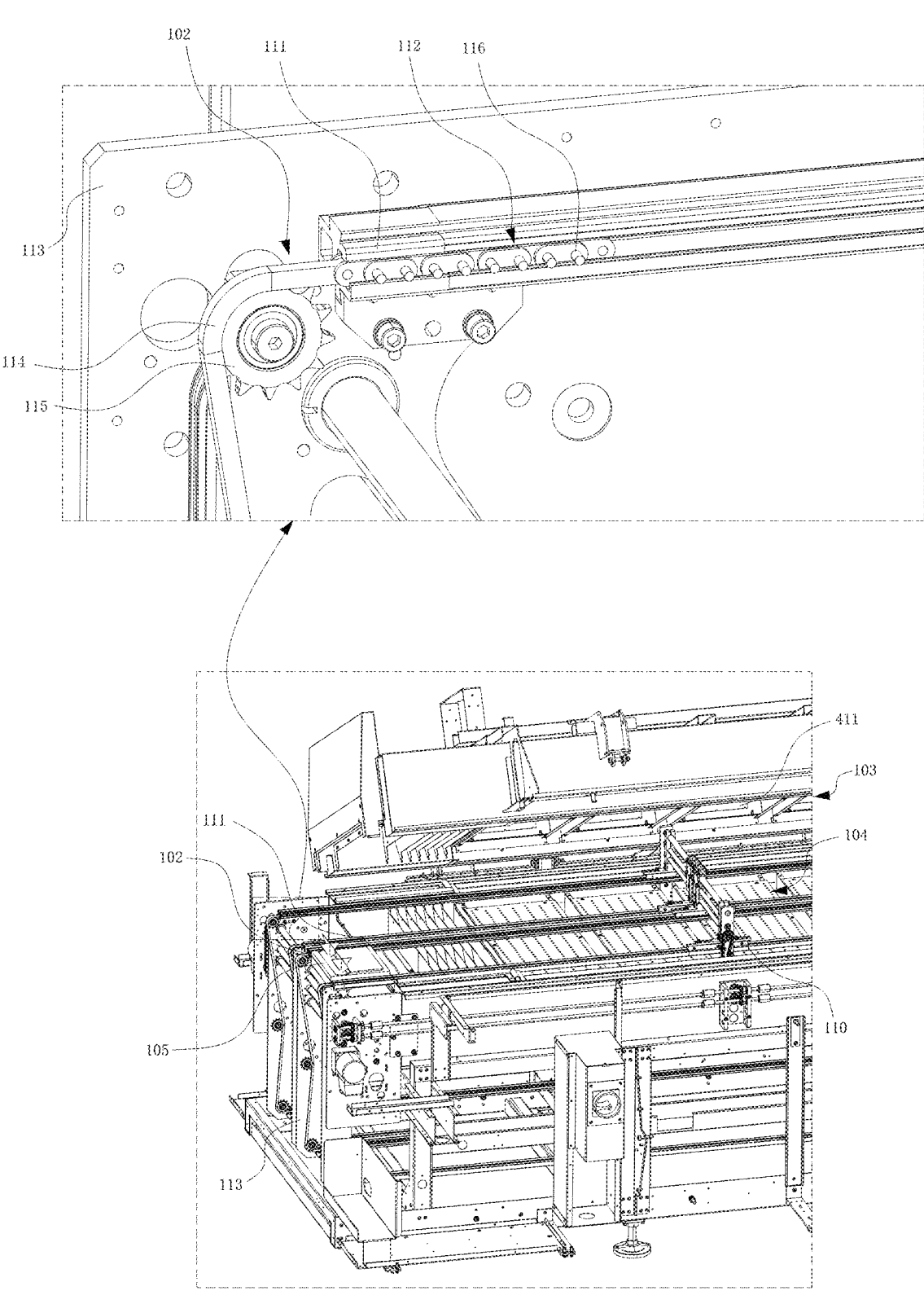
FIG. 1E is a partial enlarged view of FIG. 1D.
Figure 1F:
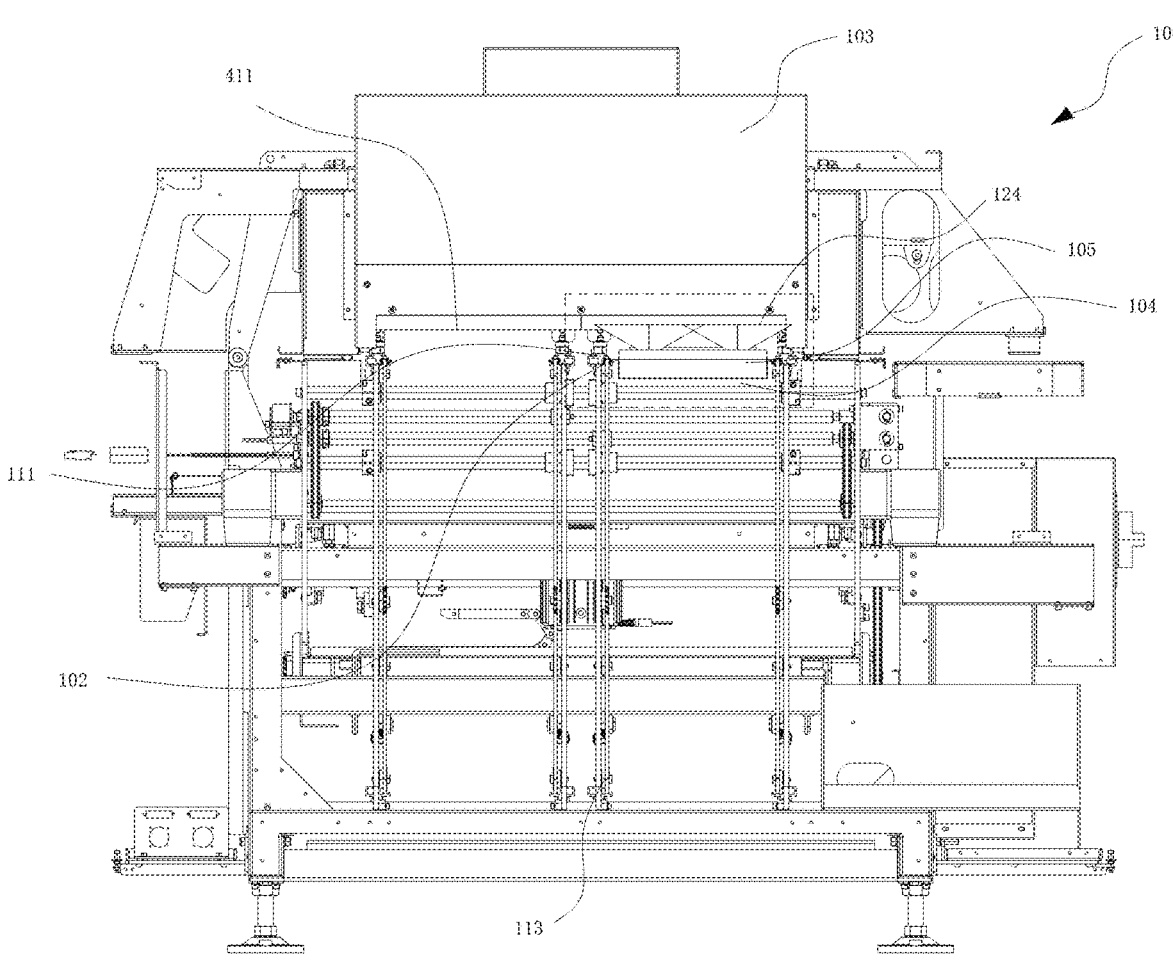
FIG. 1F is a left view of FIG. 1B.
Figure 1G:
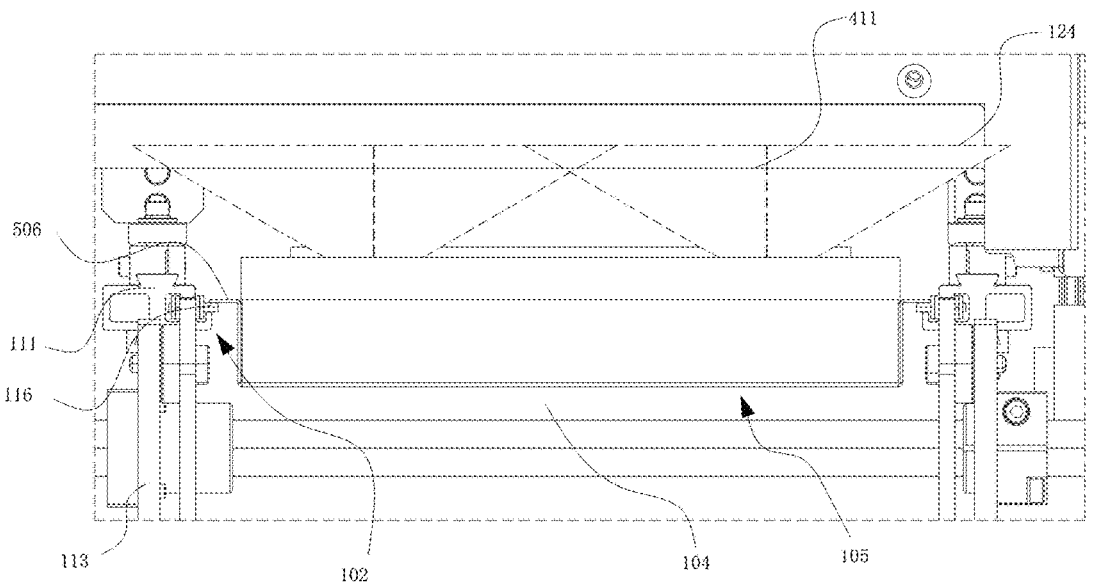
FIG. 1G is a partial enlarged view of FIG. 1F.

FIG. 1A is a perspective view of a reflow oven 100 according to the present disclosure; FIG. 1B is a perspective view of the reflow oven 100 shown in FIG. 1A with a housing 101 removed; FIG. 1C is a partial enlarged view of FIG. 1B; FIG. 1D is a perspective view of the reflow oven 100 shown in FIG. 1B in an open state; FIG. 1E is a partial enlarged view of FIG. 1D; FIG. 1F is a left view of FIG. 1B; and FIG. 1G is a partial enlarged view of FIG. 1F, to clearly show various components of the reflow oven 100 and a relationship between the various components thereof.

As shown in FIG. 1A, the reflow oven 100 comprises a housing 101, and various components of the reflow oven 100 are disposed in the housing 101. As shown in FIGS. 1B and 1D, the reflow oven 100 comprises a reflow oven chamber 104 configured to perform high-temperature treatment and then cooling treatment on a workpiece (e.g., a circuit board) (not shown) passing therethrough. The reflow oven chamber 104 spans several high-temperature zones 121 and several cooling zones 122. The reflow oven 100 further comprises several reflow oven chamber devices 103, which are disposed above and/or below the reflow oven chamber 104. Each reflow oven chamber device 103 is configured to deliver a gas flow to the reflow oven chamber 104 to process a workpiece in the reflow oven chamber 104. Reflow oven chamber devices 103 in the high-temperature zones 121 deliver a hot gas flow to the reflow oven chamber 104 to perform high-temperature treatment on the workpiece. Reflow oven chamber devices 103 in the cooling zones 122 deliver a cold gas flow or a normal-temperature gas flow (e.g., an air flow in an external environment) to the reflow oven chamber 104 to cool the workpiece.

As shown in FIGS. 1B-1G, the reflow oven 100 further comprises rails 111, rail adjustment devices 110, and a conveying device 102. The rails 111 are fixedly mounted to a frame 113 of the reflow oven 100 and run through the reflow oven chamber 104. The rail adjustment devices 110 are disposed in the reflow oven chamber 104. Each rail adjustment device 110 spans a pair of parallel rails 111 and is mounted on the pair of rails 111. Each rail adjustment device 110 is configured to adjust the width of the pair of rails 111 to which the rail adjustment device is mounted, such that the adjusted rails 111 can adapt to the conveyance of workpieces of different dimensions. Several rail adjustment devices 110 are disposed in the reflow oven chamber 104. Each rail adjustment device 110 is located between high-temperature zones 121, between cooling zones 122, or between a high-temperature zone 121 and a cooling zone 122. In this embodiment, the reflow oven 100 has double lanes, which are composed of two pairs of rails 111. Each lane of the double lanes is of the same structure. In another embodiment, the reflow oven 100 has a single lane. In other embodiments, the reflow oven 100 has a different and appropriate number of lanes.

The conveying device 102 is mounted to the rails 111 and can move along the rails 111. The conveying device 102 is configured to convey a workpiece through the reflow oven chamber 104 of the reflow oven 100, such that the workpiece can be processed. An image acquisition device 105 can be mounted to the conveying device 102 of the reflow oven 100. The mounted image acquisition device 105 can be conveyed through the reflow oven chamber 104 of the reflow oven 100 by the conveying device 102 to acquire an image of the interior of the reflow oven 100. The image acquisition device 105 is an integrated device. As shown in FIG. 1E, an upper block shows an enlarged view of a conveying device 102 and a rail 111. The conveying device 102 comprises a conveying belt 114, a gear 115, and several pin assemblies 112. Each pin assembly 112 comprises several pins 116. The conveying belt 114 meshes with the gear 115 and is partially disposed in the rail 111. The pin assembly 112 is fixed to the conveying belt 114. The gear 115 is driven to rotate by a conveying driving mechanism (not shown), to drive the conveying belt 114 to move along the rail 111, and thus drive the pin assembly 112 to move along the rail 111. In other embodiments, the conveying device 102 comprises other suitable structures.

In an embodiment, as shown in FIGS. 1E-1G, a mounting structure 506 of the image acquisition device 105 is mounted to the pins 116 of the conveying device 102, such that the image acquisition device 105 can be conveyed through the reflow oven chamber 104 of the reflow oven 100 by the conveying device 102. The mounting structure 506 is placed on the several pins 116 of the conveying device 102. The conveying device 102 can drive the pins 116 to move when moving along the rail 111, and then the pins 116 drive the image acquisition device 105 to move by means of the mounting structure 506. In other embodiments, the image acquisition device 105 is mounted to the conveying device 102 by other suitable methods, so as to be conveyed through the reflow oven 100 by the conveying device 102. FIGS. 1B-1G only show one image acquisition device 105 on one lane of the double lanes. In operations, a conveying device 102 on each lane of the double lanes is provided with an image acquisition device 105, and the image acquisition device 105 is conveyed through the reflow oven 100 along the lane to acquire an image of the interior of the reflow oven 100.

As shown in FIGS. 1B and 1F, the image acquisition device 105 is configured to, when the reflow oven 100 is in a closed state, be capable of acquiring an image of the interior of the reflow oven 100 and storing the acquired image. When the reflow oven 100 is in the closed state, the image acquisition device 105 is conveyed through the reflow oven chamber 104 of the reflow oven 100 by the conveying device 102 to acquire the image of the interior of the reflow oven 100. In an embodiment, when the reflow oven 100 is in the closed state, the reflow oven 100 is in a non-production state of normal operation, during which no workpiece passes through the reflow oven 100, and the image acquisition device 105 is conveyed through the reflow oven chamber 104 of the reflow oven 100 to acquire the image of the interior of the reflow oven 100. In another embodiment, when the reflow oven 100 is in the closed state, the reflow oven 100 is in normal operation, during which a workpiece passes through the reflow oven 100 so as to be processed, and the image acquisition device 105 is also conveyed through the reflow oven chamber 104 of the reflow oven 100 to acquire the image of the interior of the reflow oven 100. The image of the interior of the reflow oven 100 that is acquired by the image acquisition device 105 comprises an image of a surface of a reflow oven chamber device 103, an image of a rail adjustment device 110, etc. In an embodiment, the image of the surface of the reflow oven chamber device 103 is an image of a bottom surface 411 (see FIGS. 1D-1G) of an upper reflow oven chamber device 103. The image acquisition device 105 is configured to move through the reflow oven 100 toward the upper reflow oven chamber device 103 to acquire the image of the bottom surface 411 of the upper reflow oven chamber device 103 and/or the image of the rail adjustment device 110.

The image acquisition device 105 comprises two image acquisition units 502 (see FIGS. 5B-5C), such that the image acquisition device 105 can acquire images of internal components in an entire width direction of the reflow oven 100 when being conveyed through the reflow oven 100. As shown in FIG. 1G, an image acquisition field of view 124 of the image acquisition unit 502 in the width direction of the reflow oven 100 is shown at a dotted line. FIG. 1C shows an image acquisition field of view 123 of the image acquisition unit 502 in a length direction of the reflow oven 100 and an image acquisition field of view 124 of the image acquisition unit in the width direction of the reflow oven. In other embodiments, the image acquisition device 105 comprises a different and appropriate number of image acquisition units 502 to acquire images of the interior of the reflow oven 100. The image acquisition device 105 is configured to be mountable to the conveying device 102 and to pass through the reflow oven 100 by the conveying device 102 without changing other structures of the reflow oven 100. As shown in FIG. 1G, the height of the image acquisition device 105 is set to be less than the height of the reflow oven chamber 104. The image acquisition device 105 is located at an approximately middle or lower position of the reflow oven chamber 104 when mounted on the conveying device 102, such that the image acquisition device 105 can be smoothly conveyed through the reflow oven chamber 104 and can acquire an image of the components in the reflow oven 100.

Figure 2A:
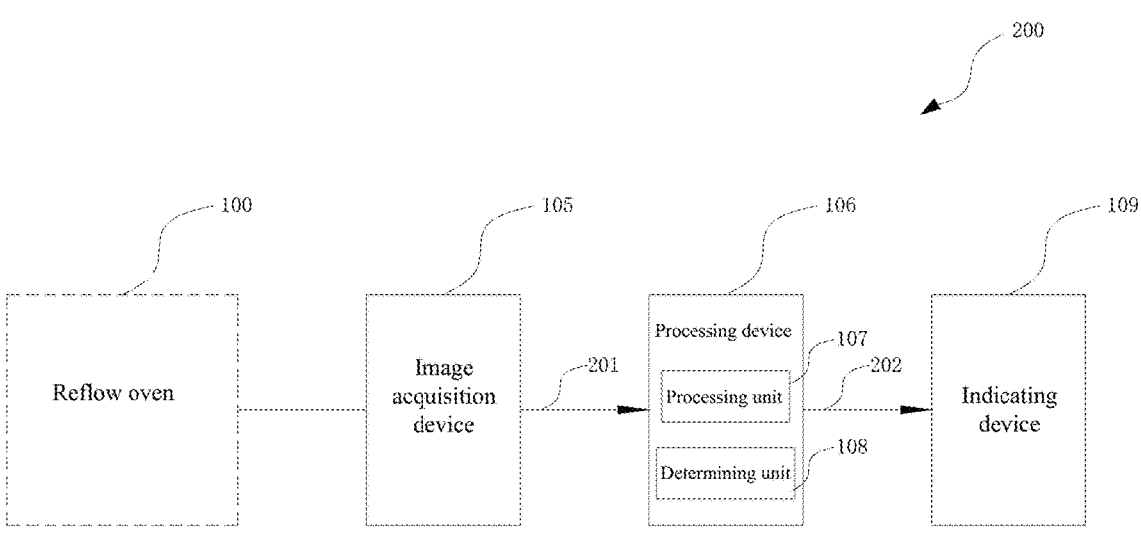
FIG. 2A is a block diagram of a system for determining whether to clean a reflow oven according to an embodiment of the present disclosure.
Figure 2B:
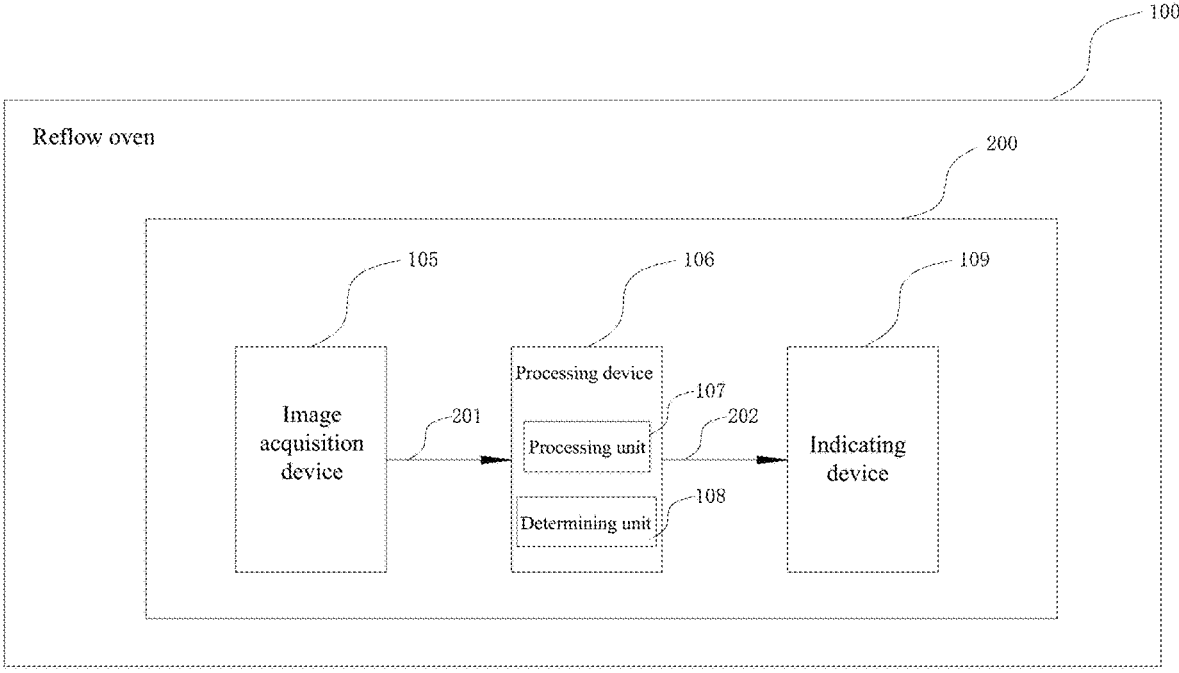
FIG. 2B is a block diagram of a system for determining whether to clean a reflow oven according to another embodiment of the present disclosure.

As shown in FIGS. 2A-2B, an image (e.g., image data) stored by the image acquisition device 105 can be output to a processing unit 107 of a processing device 106, and the processing unit 107 can process the stored image to obtain a cleanliness condition of the interior of the reflow oven 100 and output the cleanliness condition of the interior of the reflow oven 100 to a determining unit 108 of the processing device 106. The determining unit 108 can determine whether the reflow oven 100 needs to be cleaned based on the cleanliness condition of the interior of the reflow oven 100. Moreover, when it is determined that the reflow oven 100 needs to be cleaned, the determining unit 108 can output a control signal to an indicating device 109, such that the indicating device 109 sends, to a user, an indication that the reflow oven 100 needs to be cleaned, e.g., an indication that the reflow oven 100 needs to be cleaned within a predetermined period of time or an indication that the reflow oven 100 needs to be cleaned immediately. According to the present disclosure, an image of the interior of the reflow oven 100 is acquired when the reflow oven 100 is in the closed state, and the image is processed to determine whether the reflow oven 100 needs to be cleaned, thus instructing the user to clean the reflow oven 100 at an appropriate time. Therefore, according to the present disclosure, the production efficiency of the reflow oven 100 can be improved, and unnecessary downtime of the reflow oven 100 can be reduced.

When a circuit board passes through the high-temperature zones of the reflow oven, the heat in the high-temperature zones melts tin paste on the circuit board. In this case, organic compounds containing volatile organic compounds (VOCs), mainly including a soldering flux, are vaporized into vapor, thereby forming "contaminants". When the circuit board is conveyed from the high-temperature zones to the cooling zones, contaminants also flow to the cooling zones. The contaminants condense into a liquid and/or a solid and drip onto the circuit board after being cooled in the cooling zones, thus contaminating the circuit board. The contaminants may condense on the bottom surface 411 of the upper reflow oven chamber devices 103 and the surface of the rail adjustment devices 110 in the cooling zones. The contaminants condensing on the surfaces of the upper reflow oven chamber devices 103 and the rail adjustment devices 110 may drip onto a circuit board below the same when being accumulated to a certain amount, thus contaminating the circuit board. According to the present disclosure, based on the image of the surface of the reflow oven chamber device 103 and/or the image of the rail adjustment device 110, the cleanliness condition of the interior of the reflow oven 100 is obtained, and then it is determined whether the reflow oven 100 needs to be cleaned. In other embodiments, contaminants condense to other structures in the reflow oven 100 in the cooling zones. According to the present disclosure, an image of other structures in the reflow oven 100 is further obtained to determine whether the reflow oven 100 needs to be cleaned. Therefore, according to the present disclosure, the reflow oven 100 can be cleaned at an appropriate time, and contaminants (e.g., contaminants accumulated on the upper reflow oven chamber devices 103 and the rail adjustment devices 110) are prevented from dripping onto a circuit board to contaminate the circuit board, thereby improving the productivity of the reflow oven 100 and reducing unnecessary downtime. Moreover, the contaminants accumulated on the rail adjustment devices 110 further cause the rail adjustment devices 110 to fail to operate, for example, fail to adjust the width of the rails 111, which then makes the reflow oven 100 need to be shut down so that the rail adjustment devices 110 are maintained, e.g., the rail adjustment devices 110 are repaired or replaced. Therefore, images of the rail adjustment devices 110 are obtained and it is determined whether the reflow oven 100 needs to be cleaned based on the image, so that according to the present disclosure, the rail adjustment devices 110 can be cleaned at an appropriate time to ensure normal operation thereof, thereby reducing the unnecessary downtime of the reflow oven 100.

FIG. 2A is a block diagram of a system 200 for determining whether to clean a reflow oven 100 according to an embodiment of the present disclosure, and FIG. 2B is a block diagram of a system 200 for determining whether to clean a reflow oven 100 according to another embodiment of the present disclosure.

As shown in FIG. 2A, in an embodiment, the system 200 for determining whether to clean a reflow oven 100 comprises an image acquisition device 105 and a processing device 106. The processing device 106 comprises a processing unit 107 and a determining unit 108.

The image acquisition device 105 is configured to be capable of acquiring an image of the interior of the reflow oven 100 when the reflow oven 100 is in a closed state and storing the acquired image. The image acquisition device 105 is connected to the processing device 106 via a connecting line 201, and outputs the stored acquired image to the processing device 106 by means of the connecting line 201 (e.g., a data line). In the processing device 106, the processing unit 107 is configured to process the stored image to obtain a cleanliness condition of the interior of the reflow oven 100, and the determining unit 108 is configured to determine whether the reflow oven 100 needs to be cleaned based on the obtained cleanliness condition of the interior of the reflow oven 100. Determining whether the reflow oven 100 needs to be cleaned comprises determining that the reflow oven 100 needs to be cleaned within a predetermined period of time or determining that the reflow oven 100 needs to be cleaned immediately. In an embodiment, the predetermined period of time includes one week or three days. In other embodiments, the predetermined period of time comprises a different and appropriate period of time. In operation, when the reflow oven 100 is in a closed state, the image acquisition device 105 is conveyed through the reflow oven 100 to acquire and store an image of the interior of the reflow oven 100, and the processing device 106 determines whether the reflow oven 100 needs to be cleaned within a predetermined period of time based on the image. If it is determined that the reflow oven 100 needs to be cleaned within a predetermined period of time, after a period of time within the predetermined period of time, the image acquisition device 105 is conveyed through the reflow oven 100 again to acquire and store an image of the interior of the reflow oven 100, and then the processing device 106 determines whether the reflow oven 100 needs to be cleaned immediately based on the image. If it is determined that the reflow oven 100 needs to be cleaned immediately, the user is prompted to clean the reflow oven 100.

The determining unit 108 is configured to determine whether the reflow oven 100 needs to be cleaned based on the obtained cleanliness condition of the interior of the reflow oven 100 by means of artificial intelligence training. In an embodiment, in actual operations performed on the reflow oven 100 by a user, a plurality of images of the interior of the reflow oven 100 are acquired when the reflow oven 100 needs to be cleaned, and these images are used as reference images for indicating that the reflow oven 100 needs to be cleaned. The image data is trained by means of artificial intelligence, such that the determining unit 108 can determine whether the reflow oven 100 needs to be cleaned based on the images of the interior of the reflow oven 100 acquired by the image acquisition device 105 (e.g., further based on the cleanliness condition of the interior of the reflow oven 100).

In an embodiment, the determining unit 108 is configured to compare the obtained cleanliness condition of the interior of the reflow oven 100 with a reference cleanliness condition of the interior of the reflow oven 100 to determine whether the reflow oven 100 needs to be cleaned. The reference cleanliness condition comprises a cleanliness condition of a reference image. When the obtained cleanliness condition of the interior of the reflow oven 100 matches the reference cleanliness condition of the interior of the reflow oven 100, it is determined that the reflow oven 100 needs to be cleaned. The cleanliness condition of the interior of the reflow oven 100 comprises the color and area of contaminants inside the reflow oven 100, e.g., the color and area of contaminants on the surface of the reflow oven chamber devices 103 and/or the rail adjustment devices 110. In an embodiment, the color of contaminants includes black, yellow, and light yellow. A darker color indicates more serious contamination. Degrees of contaminants denoted by black, yellow, and light yellow decrease in sequence. The degree of contamination in the reflow oven 100 may also be determined based on the area of contaminants. A larger area of contaminants indicates more serious contamination. In determining, the color of contaminants takes precedence over the area of contaminants. In an embodiment, when the color of contaminants is black and the area of the black contaminants reaches an area threshold, it is substantially determined that the contamination is serious and the reflow oven 100 needs to be cleaned. Determining that the reflow oven 100 needs to be cleaned comprises determining that the reflow oven 100 needs to be cleaned within a predetermined period of time and determining that the reflow oven 100 needs to be cleaned immediately.

In another embodiment, the system 200 further comprises an indicating device 109, which is connected to the processing device 106 via a connecting line 202. When it is determined that the reflow oven 100 needs to be cleaned, the processing device 106 outputs a control signal for cleaning the reflow oven 100 to the indicating device 109 via the connecting line 202, and the indicating device 109 indicates, for example, to the user, that the reflow oven 100 needs to be cleaned according to the control signal. Indicating that the reflow oven 100 needs to be cleaned comprises indicating that the reflow oven 100 needs to be cleaned within a predetermined period of time and indicating that the reflow oven 100 needs to be cleaned immediately. In an embodiment, the indicating device 109 comprises a display device and/or an alarm device. In other embodiments, the indicating device 109 comprises other suitable devices or structures.

In an embodiment, the processing device 106 is a controller of the reflow oven 100. In another embodiment, the processing device 106 is different from the controller of the reflow oven 100. In an embodiment, the indicating device 109 is a display, an indicator lamp or an alarm lamp of the reflow oven 100. In another embodiment, the indicating device 109 is different from the display, the indicator lamp and the alarm lamp of the reflow oven 100. In other embodiments, the system 200 comprises other suitable devices or structures to determine whether to clean the reflow oven 100.

As shown in FIG. 2B, the reflow oven 100 comprises a system 200. The system 200 in FIG. 2B has the same structure as the system 200 in FIG. 2A.

Figure 3:
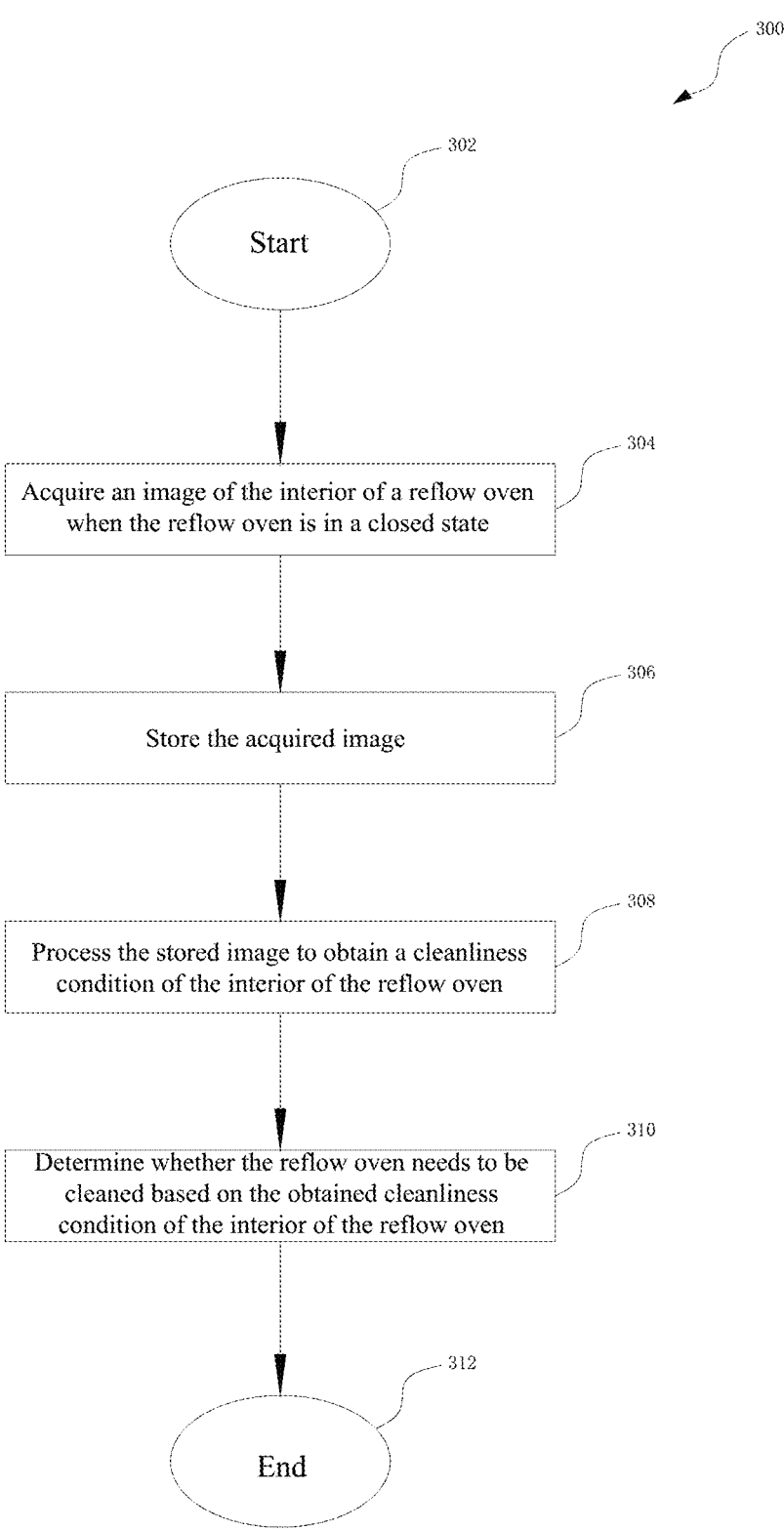
FIG. 3 is a flowchart of a method for determining whether to clean a reflow oven according to the present disclosure.

FIG. 3 is a flowchart of a method 300 for determining whether to clean a reflow oven 100 according to the present disclosure.

As shown in FIG. 3, at step 302, the method 300 for determining whether to clean a reflow oven 100 starts to be performed. Then, the process proceeds from step 302 to step 304.

At step 304, an image of the interior of the reflow oven 100 is acquired when the reflow oven 100 is in a closed state. In an embodiment, acquiring an image of the interior of the reflow oven 100 comprises: conveying an image acquisition device 105 through the reflow oven chamber 104 of the reflow oven 100 so that the image acquisition device 105 acquires the image of the interior of the reflow oven 100. Conveying an image acquisition device 105 through the reflow oven chamber 104 of the reflow oven 100 comprises: mounting the image acquisition device 105 to a conveying device 102 of the reflow oven 100, and conveying the mounted image acquisition device 105 through the reflow oven chamber 104 of the reflow oven 100 by the conveying device 102. In an embodiment, when the reflow oven 100 is in the closed state, the reflow oven 100 is in a non-production state of normal operation, during which no workpiece passes through the reflow oven 100, and the image acquisition device 105 is conveyed through the reflow oven chamber 104 of the reflow oven 100 to acquire the image of the interior of the reflow oven 100. In another embodiment, when the reflow oven 100 is in the closed state, the reflow oven 100 is in normal operation, during which a workpiece passes through the reflow oven 100 to be processed, and the image acquisition device 105 is also conveyed through the reflow oven chamber 104 of the reflow oven 100 to acquire the image of the interior of the reflow oven 100. Acquiring an image of the interior of the reflow oven 100 comprises: acquiring an image of a surface of a reflow oven chamber device 103 of the reflow oven 100 and/or acquiring an image of a rail adjustment device 110. The image of the surface of the reflow oven chamber device 103 comprises an image of a bottom surface 411 of an upper reflow oven chamber device 103. Then, the process proceeds from step 304 to step 306.

At step 306, the acquired image is stored. Then, the process proceeds from step 306 to step 308.

At step 308, the stored image is processed to obtain a cleanliness condition of the interior of the reflow oven 100. In an embodiment, processing the stored image to obtain a cleanliness condition of the interior of the reflow oven 100 comprises: processing the stored image to obtain the color and area of contaminants inside the reflow oven 100. Then, the process proceeds from step 308 to step 310.

At step 310, it is determined whether the reflow oven 100 needs to be cleaned based on the obtained cleanliness condition of the interior of the reflow oven 100. In an embodiment, determining whether the reflow oven 100 needs to be cleaned comprises: determining whether the reflow oven 100 needs to be cleaned by means of artificial intelligence training. In an embodiment, in actual operations performed on the reflow oven 100 by a user, a plurality of images of the interior the reflow oven 100 are acquired when the reflow oven 100 needs to be cleaned, and these images are used as reference images for indicating that the reflow oven 100 needs to be cleaned. The image data is trained by means of artificial intelligence, such that the determining unit 108 can determine whether the reflow oven 100 needs to be cleaned based on the images of the interior of the reflow oven 100 acquired by the image acquisition device 105 (e.g., further based on the cleanliness condition of the interior of the reflow oven 100). Determining whether the reflow oven 100 needs to be cleaned comprises: determining that the reflow oven 100 needs to be cleaned within a predetermined period of time, and determining that the reflow oven 100 needs to be cleaned immediately.

In an embodiment, determining whether the reflow oven 100 needs to be cleaned based on the obtained cleanliness condition of the interior of the reflow oven 100 comprises: comparing the obtained cleanliness condition of the interior of the reflow oven 100 with a reference cleanliness condition of the interior of the reflow oven 100 to determine whether the reflow oven 100 needs to be cleaned. The reference cleanliness condition comprises a cleanliness condition of a reference image. When the obtained cleanliness condition of the interior of the reflow oven 100 matches the reference cleanliness condition of the interior of the reflow oven 100, it is determined that the reflow oven 100 needs to be cleaned. The cleanliness condition of the interior of the reflow oven 100 comprises the color and area of contaminants inside the reflow oven 100, e.g., the color and area of contaminants on the surface of the reflow oven chamber devices 103 and/or the rail adjustment devices 110. In an embodiment, the color of contaminants includes black, yellow, and light yellow. A darker color indicates more serious contamination. Degrees of contaminants denoted by black, yellow, and light yellow decrease in sequence. The degree of contamination in the reflow oven 100 may also be determined based on the area of contaminants. A larger area of contaminants indicates more serious contamination. In determining, the color of contaminants takes precedence over the area of contaminants. In an embodiment, when the color of contaminants is black and the area of the black contaminants reaches an area threshold, it is substantially determined that the contamination is serious and the reflow oven 100 needs to be cleaned. Determining that the reflow oven 100 needs to be cleaned comprises determining that the reflow oven 100 needs to be cleaned within a predetermined period of time and determining that the reflow oven 100 needs to be cleaned immediately. In other embodiments, whether the reflow oven 100 needs to be cleaned is determined by other suitable methods. Then, the process proceeds from step 310 to step 312, and the performing of the method 300 for determining whether to clean a reflow oven 100 ends.

In another embodiment, the method 300 further comprises indicating to a user that the reflow oven 100 needs to be cleaned, which, for example, comprises indicating that the reflow oven 100 needs to be cleaned within a predetermined period of time or indicating that the reflow oven 100 needs to be cleaned immediately.

Figure 4A:
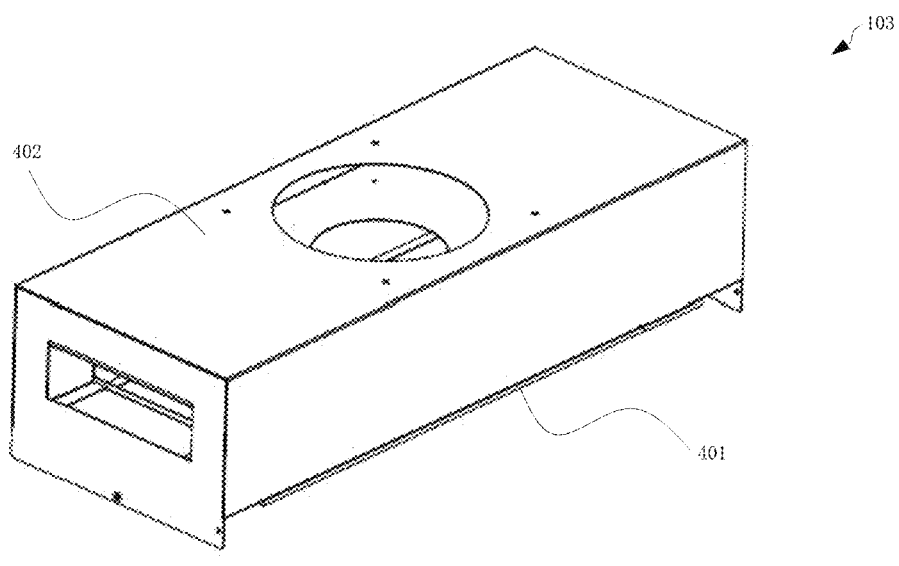
FIG. 4A is a perspective view of a reflow oven chamber device of the reflow oven shown in FIG. 1B.
Figure 4B:
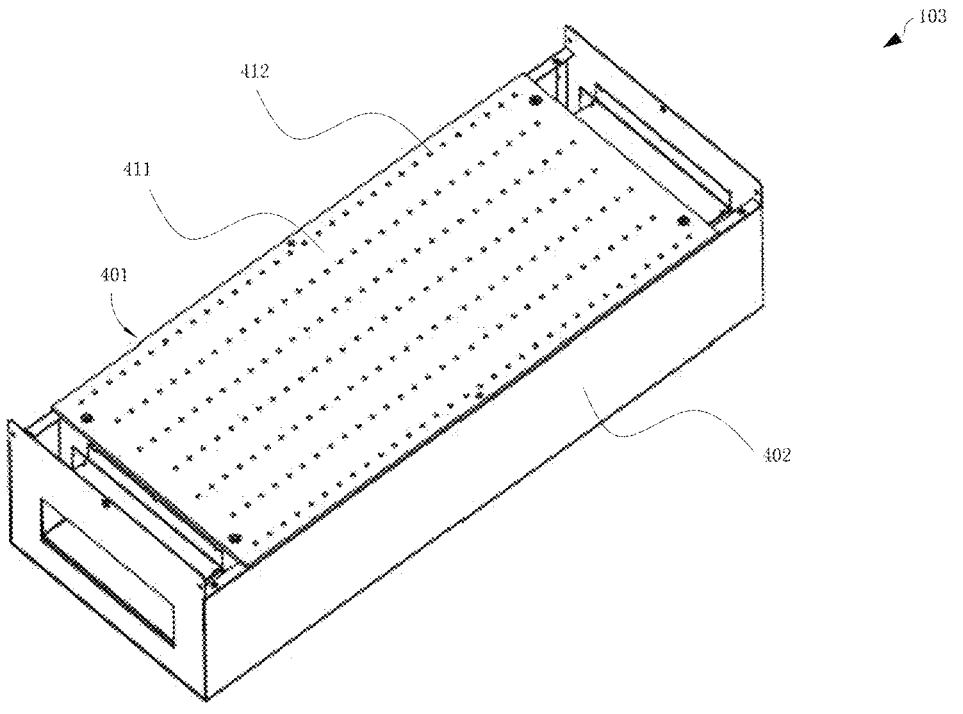
FIG. 4B is a perspective view of the reflow oven chamber device shown in FIG. 4A viewed from the bottom.

FIG. 4A is a perspective view of a reflow oven chamber device 103 of the reflow oven 100 shown in FIG. 1B, and FIG. 4B is a perspective view of the reflow oven chamber device 103 shown in FIG. 4A viewed from the bottom.

As shown in FIGS. 4A-4B, the reflow oven chamber device 103 comprises a housing 402. The housing 402 comprises a top portion and four side portions. A gas flow source (not shown) is provided in the housing 402 and is configured to output a gas flow. The reflow oven chamber device 103 further comprises a bottom plate 401 located at the bottom. The bottom plate 401 is provided with through holes 412, and the bottom plate 401 comprises a bottom surface 411. The bottom surface 411 of the bottom plate 401 is disposed toward the reflow oven chamber 104. The reflow oven chamber device 103 is configured to allow a gas flow source to deliver a gas flow through the through holes 412 in the bottom plate 401 to reach the reflow oven chamber 104. The reflow oven chamber device 103 shown in FIGS. 4A-4B is an upper reflow oven chamber device 103, which is disposed above the reflow oven chamber 104. The upper reflow oven chamber device 103 delivers the gas flow through the through holes 412 in the bottom plate 401 to reach the reflow oven chamber 104 below the same.

When vapor contaminants generated in the high-temperature zones flow to the cooling zones, the contaminants condense onto the surface of the reflow oven chamber devices 103 in the cooling zones. The contaminants condense onto the bottom surface 411 of the upper reflow oven chamber devices 103. When the contaminants accumulated on the bottom surface 411 meet a certain amount, the contaminants leave the bottom surface 411 and drip down onto a circuit board below the same, thus contaminating the circuit board.

Figure 5A:
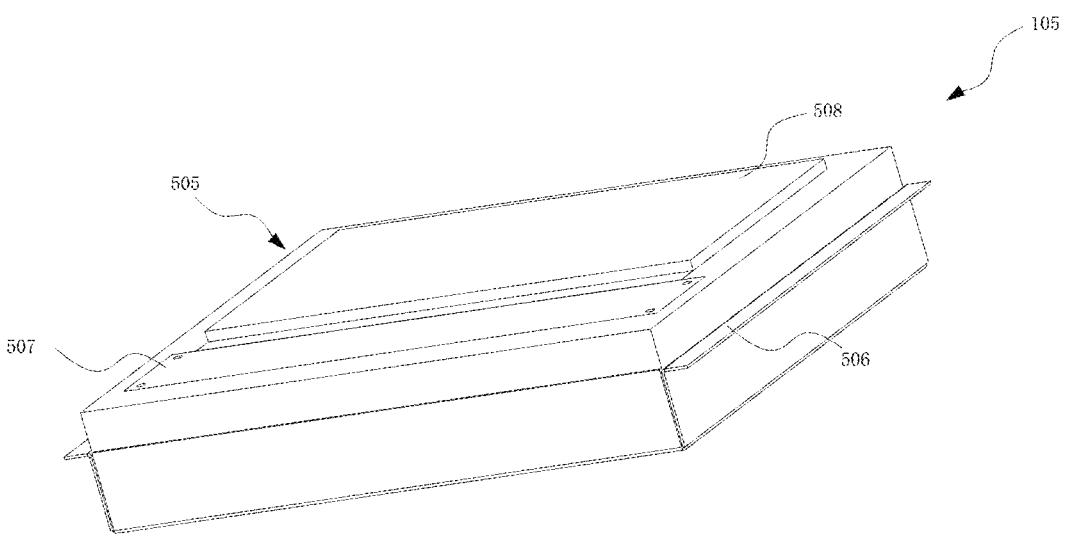
FIG. 5A is a perspective view of an image acquisition device on the reflow oven shown in FIG. 1B.
Figure 5B:
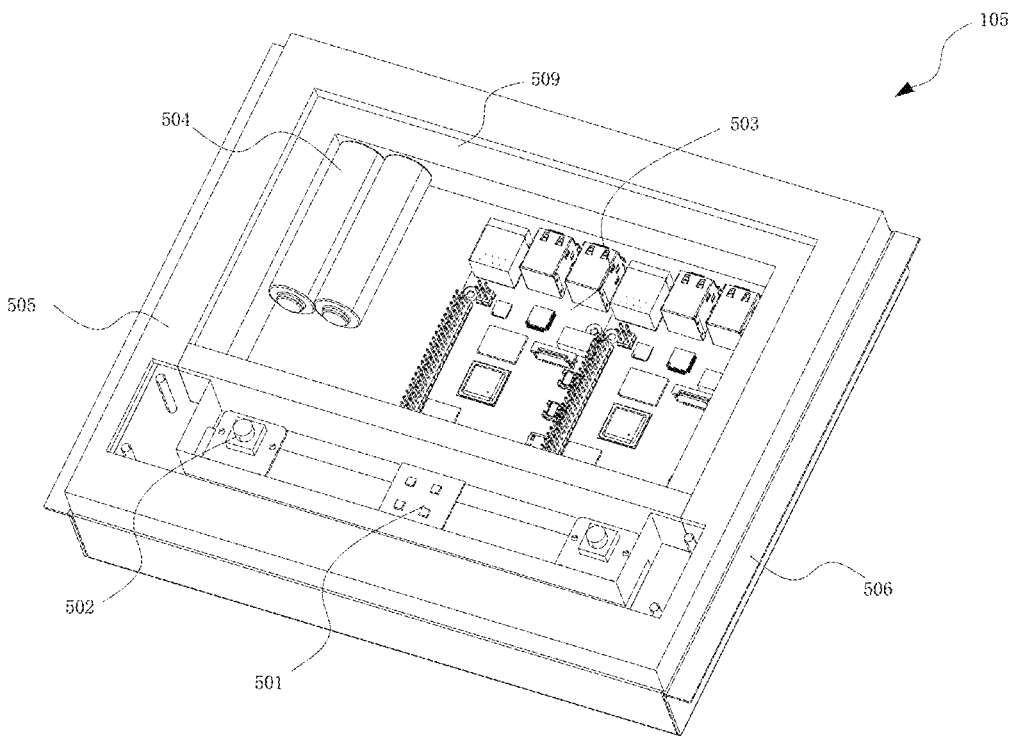
FIG. 5B is a perspective view of the image acquisition device shown in FIG. 5A with part of a housing removed.
Figure 5C:
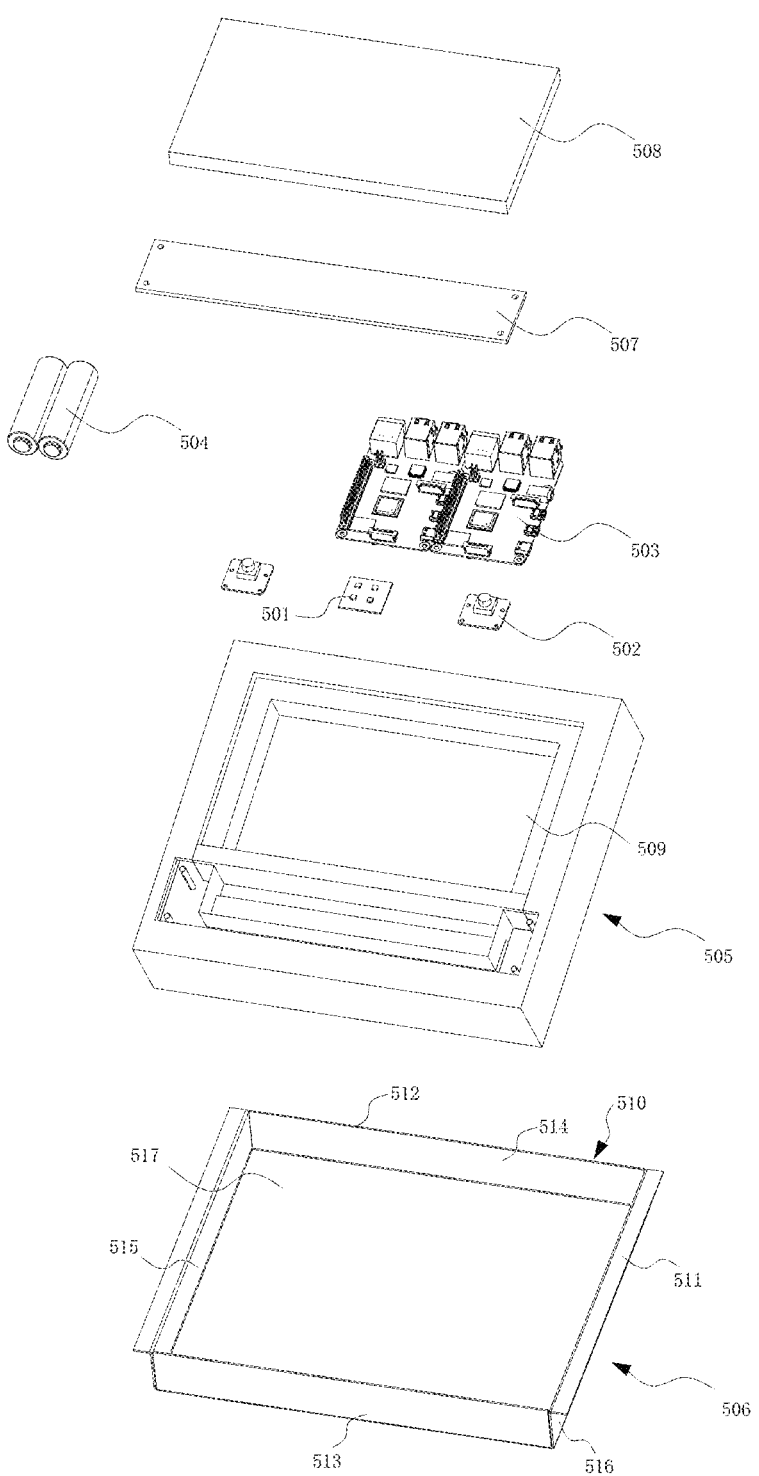
FIG. 5C is an exploded view of FIG. 5A.

FIG. 5A is a perspective view of an image acquisition device 105 on the reflow oven 100 shown in FIG. 1B, FIG. 5B is a perspective view of the image acquisition device 105 shown in FIG. 5A with part of a housing removed, and FIG. 5C is an exploded view of FIG. 5A.

As shown in FIGS. 5A-5C, the image acquisition device 105 comprises a housing 505 and a mounting structure 506. The housing 505 is configured to accommodate internal components of the image acquisition device 105. The internal components comprise a light source 501, an image acquisition unit 502, a controller 503, and a power source 504. When the image acquisition device 105 is conveyed through the reflow oven 100, the housing 505 can insulate against the heat in the reflow oven 100, outside the housing 505. In an embodiment, the housing 505 is made of a thermal insulation material, such as ceramic fiber. The mounting structure 506 is configured to support the housing 505. The mounting structure 506 is of a rigid structure. The mounting structure 506 can be mounted to a conveying device 102 of the reflow oven 100, such that the image acquisition device 105 can be conveyed through the reflow oven chamber 104 of the reflow oven 100 by the conveying device 102.

There is an opening 509 at the top of the housing 505. A transparent partition 507 and a heat insulation plate 508 are provided in the opening 509. The transparent partition 507 is disposed above the light source 501 and the image acquisition unit 502, and is configured to block heat transfer from the reflow oven 100 to the light source 501 and the image acquisition unit 502. The transparent partition 507 enables light emitted by the light source 501 to pass through the transparent partition 507 to illuminate internal components of the reflow oven 100, and enables the image acquisition unit 502 to acquire an image of the illuminated internal components of the reflow oven 100. When the transparent partition 507 is dismounted, the light source 501 and the image acquisition unit 502 can be mounted into the housing 505 or dismounted from the housing 505 through the opening 509. The heat insulation plate 508 is disposed above the controller 503 and the power source 504, and is configured to block heat transfer from the reflow oven 100 to the controller 503 and the power source 504. When the heat insulation plate 508 is dismounted, the controller 503 and the power source 504 can be mounted into the housing 505 or dismounted from the housing 505 through the opening 509. The heat insulation plate 508 is made of a thermal insulation material.

As shown in FIG. 5B, the image acquisition device 105 comprises a light source 501, an image acquisition unit 502, a controller 503, and a power source 504, which are all disposed in the housing 505. The light source 501 is configured to illuminate the interior of the reflow oven 100. In an embodiment, the light source 501 illuminates the reflow oven chamber devices 103 and/or the rail adjustment devices 110. In an embodiment, the light source 501 is a flash lamp, such as an LED lamp. The image acquisition unit 502 is configured to acquire the image of the interior of the reflow oven 100 when the light source 501 illuminates the interior of the reflow oven 100. The light source 501 provides illumination for the image acquisition unit 502, such that the image acquisition unit 502 can acquire a clear image of the interior of the reflow oven 100. The controller 503 is configured to control operations of the image acquisition unit 502 and the light source 501 to cause the image acquisition unit 502 to acquire the image of the interior of the reflow oven 100 and to store the image acquired by the image acquisition unit 502. The controller 503 is connected to the image acquisition unit 502 and the light source 501 via connecting lines (not shown). The controller 503 comprises a control circuit and a storage circuit. The control circuit is configured to control operations of the image acquisition unit 502 and the light source 501, and the storage circuit is configured to store image data acquired by the image acquisition unit 502. In an embodiment, the controller 503 controls the image acquisition unit 502 and the light source 501 to be activated synchronously. In another embodiment, the controller 503 controls the light source 501 to be always activated during the conveying of the image acquisition unit 502 through the reflow oven 100. The controller 503 comprises an interface, such as a USB interface, which is connected to the processing device 106. The controller 503 outputs image data stored therein to the processing device 106 via the interface (see FIGS. 2A-2B), so that the processing device 106 processes the image data by to determine whether the reflow oven 100 needs to be cleaned. The power source 504 is configured to supply power to the light source 501, the image acquisition unit 502, and the controller 503. In an embodiment, the power source 504 is a battery.

As shown in FIGS. 5B-5C, the image acquisition device 105 comprises two image acquisition units 502, such that the image acquisition device 105 can acquire images of internal components in an entire width direction of the reflow oven when being conveyed through the reflow oven 100. In other embodiments, the image acquisition device 105 comprises a different and appropriate number of image acquisition units 502 to acquire images of the interior of the reflow oven 100.

As shown in FIG. 5C, the mounting structure 506 comprises a main body portion 510 and a flange 511. The main body portion 510 is an open housing with an opening 512 at the top. The main body portion 510 has a front portion 513, a rear portion 514, a left portion 515, a right portion 516, and a bottom portion 517. A top edge of the left portion 515 and a top edge of the right portion 516 are both connected to the flange 511. The flange 511 is configured to be mounted to the conveying device 102, for example, disposed on a pin assembly 112 of the conveying device 102 (see FIGS. 1E-1G), such that the image acquisition device 105 is mounted to the conveying device 102 and is conveyed through the reflow oven 100 by the conveying device 102. In other embodiments, the mounting structure 506 comprises other suitable structures, such that the image acquisition device 105 is mounted to the conveying device 102. In an embodiment, the mounting structure 506 is integrally formed. In other embodiments, the mounting structure 506 is formed in other suitable manners.

In other embodiments, the image acquisition device 105 comprises other suitable structures and/or devices, so as to be conveyed through the reflow oven 100 to acquire the image of the interior of the reflow oven 100.

Figure 6A:
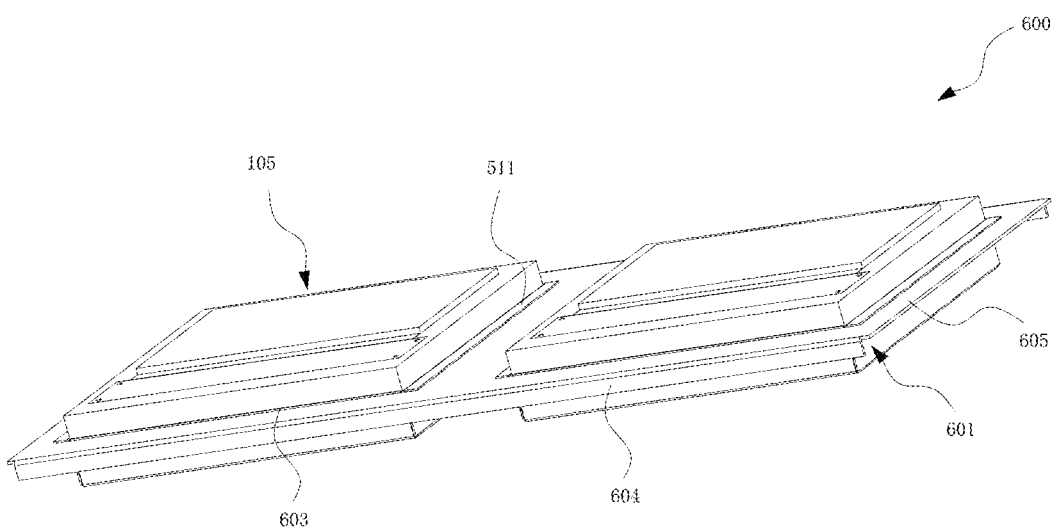
FIG. 6A is a perspective view of an image acquisition device according to another embodiment.
Figure 6B:
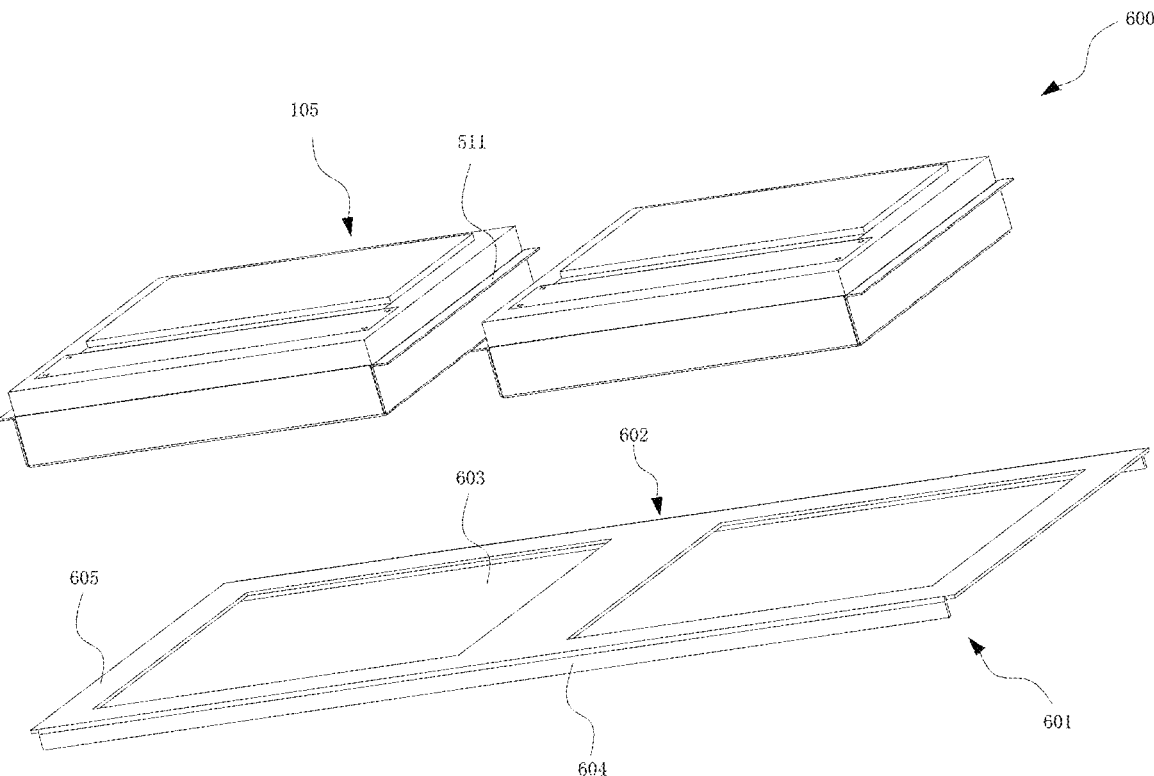
FIG. 6B is an exploded view of FIG. 6A.

FIG. 6A is a perspective view of an image acquisition device 600 according to another embodiment, and FIG. 6B is an exploded view of FIG. 6A.

As shown in FIGS. 6A-6B, the image acquisition device 600 comprises an image acquisition device 105 and a mounting structure 601. In this embodiment, the image acquisition device 600 comprises two image acquisition devices 105. In other embodiments, the image acquisition device 600 comprises a different and appropriate number of image acquisition devices 105. The image acquisition device 600 is suitable for a single-lane reflow oven 100 (not shown). The width of the single-lane reflow oven 100 is large, so there is a need for several image acquisition devices 105 disposed in parallel to acquire images of the interior of the reflow oven 100 along the entire width. The image acquisition device 600 is further configured to acquire an image of the interior of a reflow oven 100 with other suitable structures. In the aforementioned embodiment, as shown in FIGS. 1B-1G, the reflow oven 100 has double lanes, and each lane is provided with an image acquisition device 105.

The image acquisition device 105 in FIGS. 6A-6B has the same structure as the image acquisition device 105 in FIGS. 5A-5C. The mounting structure 601 can be mounted to a conveying device 102 of the reflow oven 100, such that the image acquisition device 600 can be conveyed through the reflow oven 100 by the conveying device 102. In an embodiment, the mounting structure 601 is disposed on a pin assembly 112 of the conveying device 102. During conveying by the conveying device 102, the pin assembly 112 moves to drive the mounting structure 601 to move, and further drive the image acquisition device 600 to move.

The mounting structure 601 is further configured to support the image acquisition devices 105. As shown in FIGS. 6A-6B, the mounting structure 601 comprises a main body portion 602 and a limiting portion 604. The main body portion 602 comprises openings 603 configured to accommodate the image acquisition devices 105. The image acquisition devices 105 can pass through the openings 603 until the flanges 511 of the image acquisition devices 105 are blocked by the main body portion 602. The flanges 511 of the image acquisition devices 105 are disposed on a non-opening part of the main body portion 602, so that the main body portion 602 can support the image acquisition devices 105. The dimensions of each opening 603 are substantially the same as the dimensions of the image acquisition device 105, such that the image acquisition device 105 is substantially kept fixed in the opening 603 in a horizontal direction of the reflow oven 100. The limiting portion 604 is connected to a front edge and a rear edge of the main body portion 602, and extends downwardly from the front edge and the rear edge. The length of the limiting portion 604 is less than the length of the main body portion 602, such that protruding portions 605 extending in a width direction are respectively reserved on a left side and a right side of the main body portion 602. Each protruding portion 605 is configured to be mounted to the conveying device 102 of the reflow oven 100, for example, disposed on the pin assembly 112 of the conveying device 102. The limiting portion 604 and the protruding portions 605 are configured such that the mounting structure 601 can be easily mounted to the conveying device 102.

In other embodiments, the mounting structure 601 comprises other suitable structures.

Figure 7:
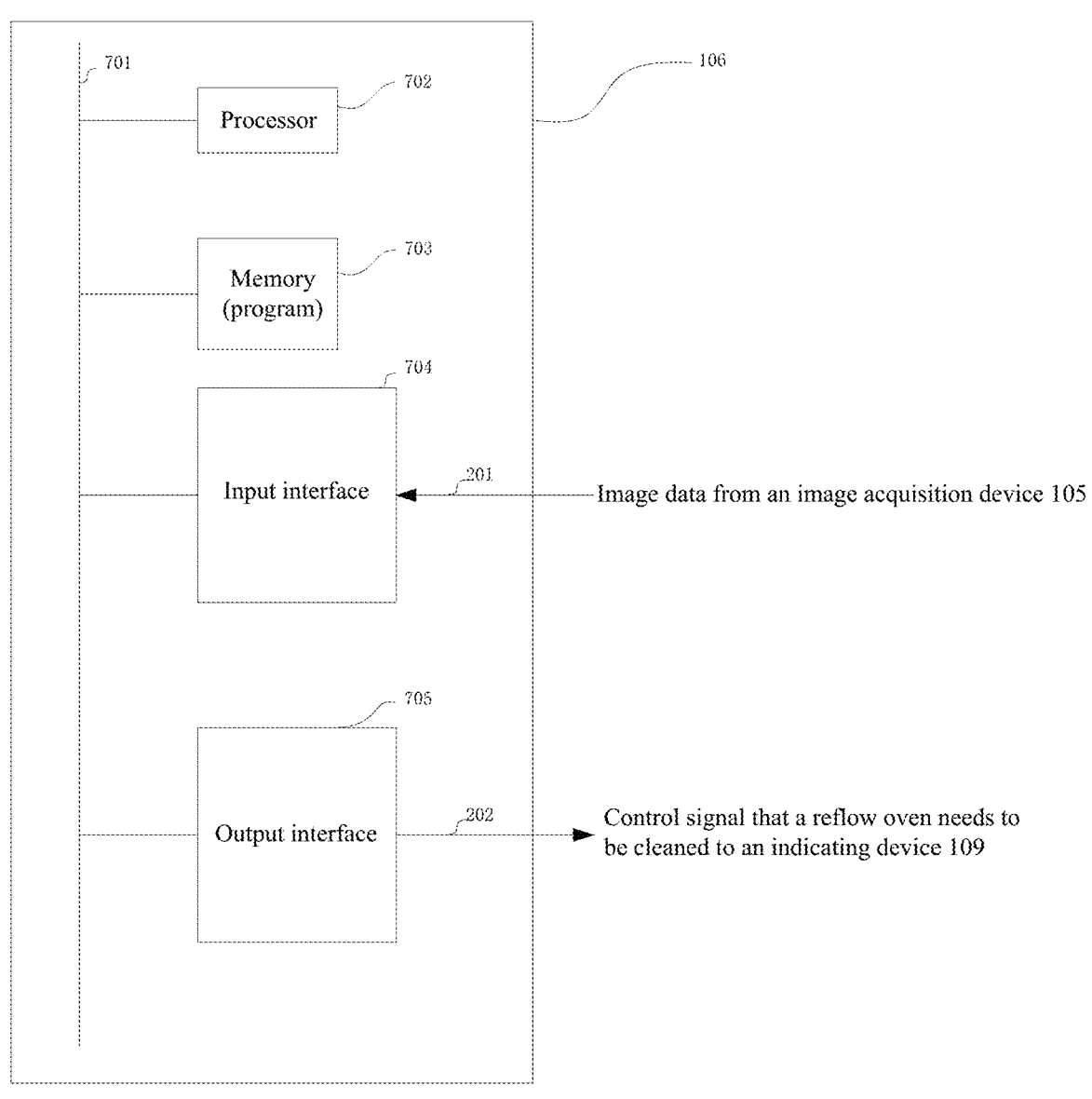
FIG. 7 is a block diagram of a processing device shown in FIGS. 2A-2B.

FIG. 7 is a block diagram of a processing device 106 shown in FIGS. 2A-2B. As shown in FIG. 7, the processing device 106 comprises a bus 701, a processor 702, a memory 703, an input interface 704, and an output interface 705. The processor 702, the memory 703, the input interface 704 and the output interface 705 are connected to the bus 701. The processor 702 may read programs (or instructions) from the memory 703 and execute the programs (or the instructions) to process data and/or control each component of the reflow oven 100. The processor 702 may further write data or programs (or instructions) into the memory 703. The memory 703 may store the programs (instructions) or the data. By executing the instructions in the memory 703, the processor 702 may control the memory 703, the input interface 704, and the output interface 705.

The input interface 704 is configured to receive image data from the image acquisition device 105 via a connecting line 201. The input interface 704 is further configured to convert the received image data into a signal recognizable by the processor 702 and output the signal to the processor 702. The processor 702 is configured to process (e.g., calculate and determine) the received signal to output a control signal indicating that the reflow oven 100 needs to be cleaned.

The output interface 705 is configured to receive the control signal from the processor 702, convert the control signal into an output signal suitable for an indicating device 109, and send the output signal to the indicating device 109 via a connecting line 202, such that the indicating device 109 generates an indication that the reflow oven 100 needs to be cleaned, which, for example, comprises an indication that the reflow oven 100 needs to be cleaned within a predetermined period of time, and an indication that the reflow oven 100 needs to be cleaned immediately.

Although the present disclosure is described with reference to the examples of embodiments outlined above, various alternatives, modifications, variations, improvements and/or substantial equivalents, which are known or anticipated at present or to be anticipated before long, may be obvious to those of at least ordinary skill in the art. In addition, the technical effects and/or technical problems described in this specification are exemplary rather than limiting. Therefore, the disclosure in this specification may be used to solve other technical problems and have other technical effects and/or may solve other technical problems. Accordingly, the examples of the embodiments of the present disclosure as set forth above are intended to be illustrative rather than limiting. Various changes may be made without departing from the spirit or scope of the present disclosure. Therefore, the present disclosure is intended to embrace all known or earlier disclosed alternatives, modifications, variations, improvements and/or substantial equivalents.

What is claimed is:

1. A system for determining whether to clean a reflow oven, comprising:

an image acquisition device configured to acquire an image of an interior surface of the reflow oven when the reflow oven is in a closed state and storing the acquired image;

a reflow oven chamber configured to enable a workpiece to be transported through the reflow open chamber and processed in the reflow oven chamber, wherein the image acquisition device is configured to enable a workpiece to be transported through the reflow oven chamber of the reflow oven to acquire the image of the interior surface of the reflow oven;

a processing unit configured to process the stored image to obtain a cleanliness condition of the interior of the reflow oven; and a determining unit configured to determine whether the reflow oven needs to be cleaned based on the obtained cleanliness condition of the interior of the reflow oven.

2. The system according to claim 1, wherein the image acquisition device is configured to be mounted to a conveying device of the reflow oven, such that the mounted image acquisition device configured to be conveyed through the reflow oven chamber of the reflow oven by the conveying device.

3. The system according to claim 1, wherein the reflow oven comprises a reflow oven chamber device and a reflow oven chamber, the reflow oven chamber device being configured to deliver a gas flow to the reflow oven chamber to process a workpiece in the reflow oven chamber, wherein the image of the interior surface of the reflow oven comprises an image of a surface of the reflow oven chamber device of the reflow oven.

4. A system for determining whether to clean a reflow oven, comprising:

an image acquisition device configured to acquire an image of an interior surface of the reflow oven when the reflow oven is in a closed state and storing the acquired image;

a processing unit configured to process the stored image to obtain a cleanliness condition of the interior of the reflow oven; and a determining unit configured to determine whether the reflow oven needs to be cleaned based on the obtained cleanliness condition of the interior of the reflow oven, wherein the reflow oven comprises a rail adjustment device configured to adjust the width of a rail for a workpiece, wherein the image of the interior of the reflow oven comprises an image of the rail adjustment device.

5. The system according to claim 1, wherein the image acquisition device comprises:

a light source configured to illuminate the interior surface of the reflow oven;

an image acquisition unit configured to acquire the image of the interior surface of the reflow oven when the light source illuminates the interior surface of the reflow oven;

a controller configured to control operations of the image acquisition unit and the light source to cause the image acquisition unit to acquire the image of the interior surface of the reflow oven, and to store the image acquired by the image acquisition unit; and a power source configured to supply power to the light source, the image acquisition unit and the controller.

6. A system for determining whether to clean a reflow oven, comprising:

an image acquisition device configured to acquire an image of an interior surface of the reflow oven when the reflow oven is in a closed state and storing the acquired image, wherein the image acquisition device comprises:

a light source configured to illuminate the interior surface of the reflow oven;

an image acquisition unit configured to acquire the image of the interior surface of the reflow oven when the light source illuminates the interior surface of the reflow oven, a controller configured to control operations of the image acquisition unit and the light source to cause the image acquisition unit to acquire the image of the interior surface of the reflow oven, and to store the image acquired by the image acquisition unit;

a power source configured to supply power to the light source, the image acquisition unit and the controller;

a housing configured to accommodate the light source, the image acquisition unit, the controller and the power source, and to insulate against the heat in the reflow oven; and a mounting structure configured to support the housing and to be mounted to a conveying device of the reflow oven, so as to enable the image acquisition device to be conveyed through the reflow oven by the conveying device;

a processing unit configured to process the stored image to obtain a cleanliness condition of the interior of the reflow oven; and a determining unit configured to determine whether the reflow oven needs to be cleaned based on the obtained cleanliness condition of the interior of the reflow oven.

7. The system according to claim 6, wherein the housing comprises:

a transparent partition disposed above the light source and the image acquisition unit and configured to block heat transfer from the reflow oven to the light source and the image acquisition unit.

8. The system according to claim 1, wherein the image acquisition device is an integrated device.

9. A reflow oven, comprising a system for determining whether to clean a reflow oven according to claim 1.

* * * * *